Sept. 28, 1943.  H. L. BAKER  2,330,329
SECTIONAL MOLD FOR TIRE CASINGS
Filed Aug. 30, 1940  2 Sheets-Sheet 1
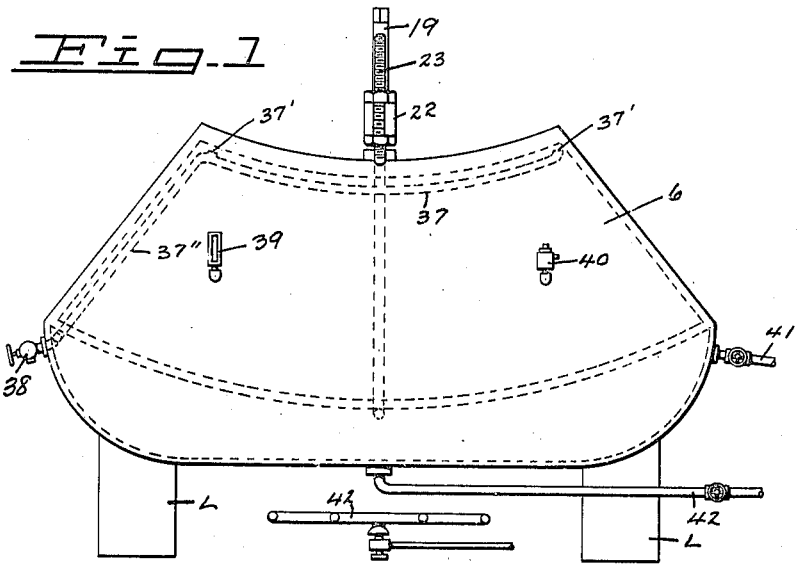
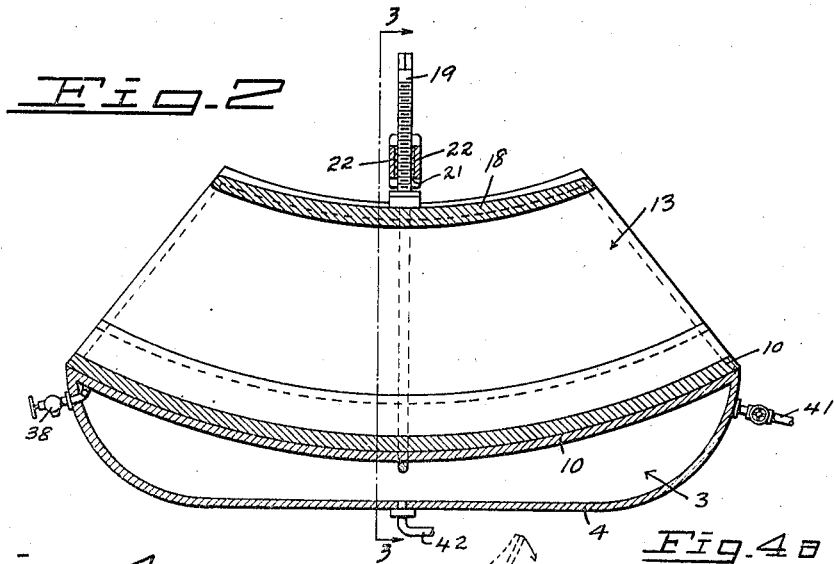
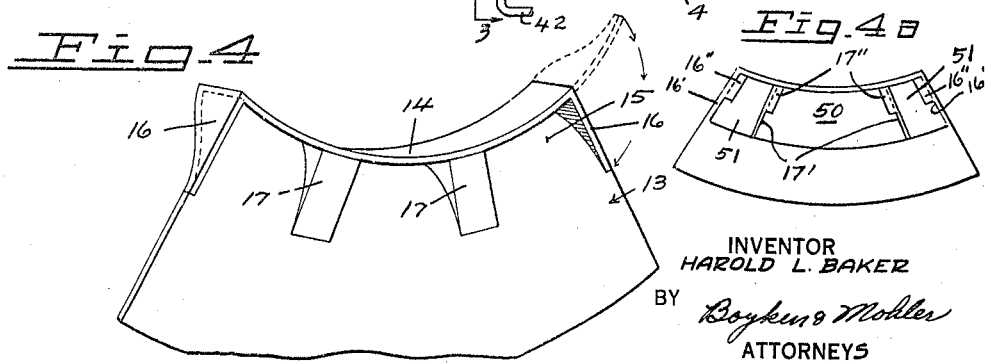
INVENTOR
HAROLD L. BAKER
BY Boyken & Mohler
ATTORNEYS

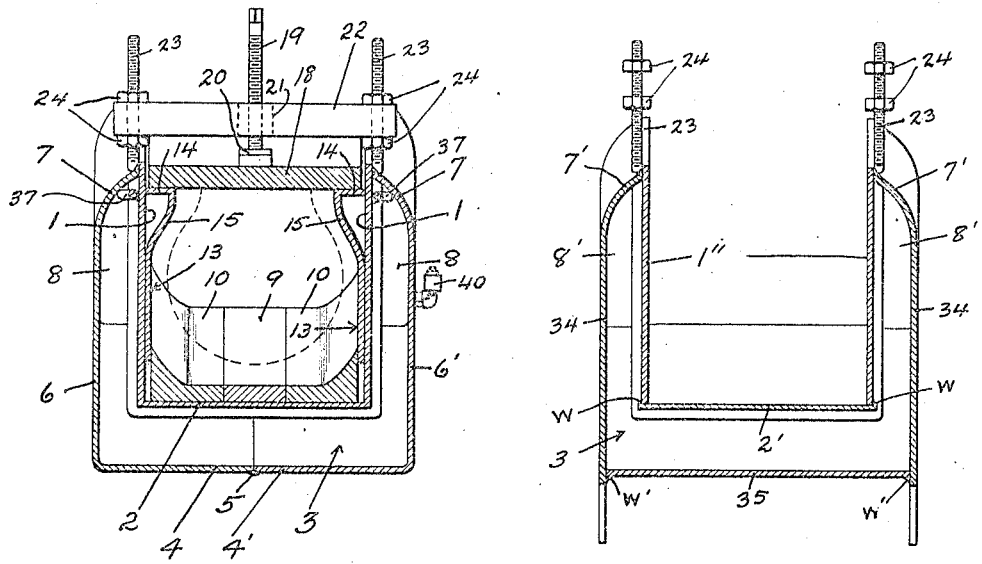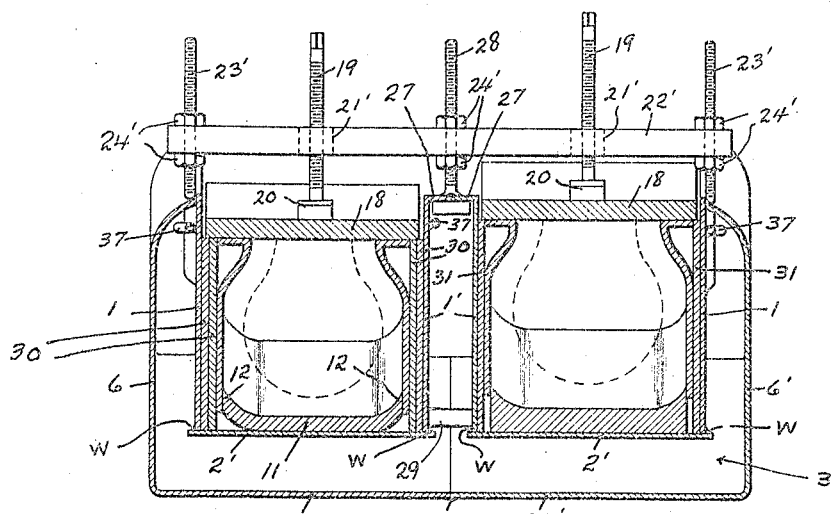

Patented Sept. 28, 1943

2,330,329

UNITED STATES PATENT OFFICE 2,330,329

SECTIONAL MOLD FOR TIRE CASINGS

Harold L. Baker, Oakland, Calif.

Application August 30, 1940, Serial No. 354,811

4 Claims. (Cl. 18—18)

This invention relates to molds for tire casings, the illustrations and description being specifically directed to a sectional mold in which a section only of a tire casing is to be received for repairing.

One of the objects of the invention is an improved mold of the above character, constructed from sheet steel, such, for example, as boiler plate, and which mold is stronger, lighter and more economical to make than heretofore.

Another object of the invention is an improved sectional mold for use in the repair of tire casings, that is adapted to be very quickly fabricated from cold rolled sheet metal, and is free from latent defects as commonly exist in cast molds, and which improved mold is substantially free from porosity, warpage, susceptibility to injury in handling and in use, and insures a more uniform and more efficient vulcanization of the tire than heretofore.

Other objects and advantages will appear in the description and drawings.

In the drawings, Fig. 1 is a side elevational view of my improved mold.

Fig. 2 is a longitudinal sectional view of the mold of Fig. 1.

Fig. 3 is a cross-sectional view taken along line 3—3 of Fig. 2, with a tire casing therein indicated in dotted line.

Fig. 4 is a perspective view of one of the improved, removable, side-wall plates that constitutes a part of the mold, a portion of the plate during the development thereof being indicated in dotted line at one end of the plate, and Fig. 4a is a reduced size elevational view of a slightly different structure in the side wall plate.

Fig. 5 is a cross-sectional view illustrating a mold for use in repairing several tire casings simultaneously, if desired, and which view also shows means for adjusting the molds to various sized tire casings, which latter means is equally adaptable for use in the single mold illustrated in Fig. 3.

Fig. 6 is a sectional mold of similar form to that of Figs. 1 to 3, except as to a slight modification in construction.

Fig. 7 is a fragmentary sectional view showing the development of a sheet metal tread plate illustrated in the left-hand cavity in Fig. 5.

Briefly described, tire molds for vulcanizing tires or sections thereof, are generally the same insofar as their mode of operation. Each has a steam chamber in which steam may be introduced from a source of supply or water in said chamber may be converted into steam by any desirable source of heat. Side wall plates, a tread plate and a bead plate are conventional elements of a sectional mold. A conventional air bag is fitted into the casing at the section to be repaired and when the casing with the air bag therein is in the mold, together with relatively plastic rubber properly positioned to effect a repair, the steam in the steam chamber heats the side plates, tread plate, etc. and the vulcanization of the rubber at the section is accomplished in the usual manner for restoring the injured part of the casing to its normal condition.

Heretofore, sectional molds have been cast in various forms. Some molds are inseparable sections for insertion of the casing and for release thereof, but in each of the molds there is an enclosed steam chamber that extends across the tread of the tire casing and over both side walls, the inner walls of which are adjacent the tire, but which are generally spaced from the tire casing by removable side wall plates and a tread plate.

The above described conventional molds are practically impossible to produce with the assurance of uniform strength in the walls of the steam chamber, due to air pockets therein and to varying thicknesses in said walls. Due to the steam pressure in said steam chamber, these weaknesses have not infrequently resulted in dangerous explosions that have been fatal to the operators, or else have maimed, crippled or injured the operators to various degrees. Also cast molds are generally porous to a greater or lesser degree, due to imperfections and to the character of the metal resulting many times in a dry boiler or mold, which means that the mold or boiler tubes or both must be replaced.

Thus far, attempts to overcome these objections have resulted merely in more intensive efforts to locate any latent defects or in increasing the thickness of the mold walls to an extent where the possible weakest point is believed sufficient to withstand the pressure. Nevertheless, latent defects escape the most rigid examination and the added weight and thickness to minimize danger results in loss in efficiency and appreciable added expense. Costs of cast molds due to the labor costs and to the expense of materials has heretofore been far too great to enable small operators to give the public the convenience of making quick and effective repairs at any cost, and the excessive costs of the molds to large concerns has only enabled them to render the public the service of repairs, but at a cost that is excessive when the cost of new tires is considered.

My invention overcomes the above objections, and others, which occur quite commonly in cast molds, such as unequal heat transfer in the mold walls; warpage; the tendency of the cast molds to easily break, etc. It is not unusual in large cast molds to find that there is a variation up to 30° F. in the heat transfer efficiency at various points in the mold walls. When it is considered that correct vulcanization requires application of a substantially uniform temperature at between 286° F. and 293° F., the vital importance of insuring transfer of a uniform amount of heat at all points in the mold walls adjacent the tire section, is apparent.

The use of boiler plate, or sheet steel in applicant's mold also provides a mold free from any latent weaknesses or defects, and capable of withstanding pressures far in excess of a cast mold, and pressures far in excess of that employed in vulcanizing. Heretofore the need for a strong, cheap, and reliable sectional mold has been recognized in the trade, but the attempts of which I am aware, for producing such mold, have been restricted to attempts to cheapen cast mold structure, the cheapest of which molds is far in excess of the cost of producing my mold.

In detail, the main body of my mold, as illustrated in Figs. 1 to 3, inclusive, comprises a central, elongated channel, in which the side walls are indicated at 1, and the bottom at 2 (Fig. 3). This channel may be stamped from a single sheet of rolled steel, such as boiler plate. The bottom 2 of said channel and the line of bend defining the connecting edges of the bottom and side walls, are arcuate, longitudinally of the channel, with the concave side of the bottom facing the space between the side walls.

Within the aforesaid channel the tire section to be repaired is received, hence the curvature of said bottom generally conforms to the circumferential curvature of said tire section. However, the use of removable side wall plates and a tread plate, and filter plates, as will later be described, enables the use of the mold for various sized tire casings and provides a support for the tire casing that conforms to the outer contour of the tire transversely thereof.

The walls of the channel also comprise walls of a steam chamber 3, the remaining walls of which chamber comprise angle strips, the short legs 4, 4' of which are welded together at 5 at a point centrally below bottom 2, and which legs extend longitudinally of said bottom, but spaced therefrom, curving upwardly at their ends to join the ends of said bottom to which said ends are welded. The longer legs 6, 6' of said angle strips extend upwardly in opposed relation and are spaced outwardly of the sides 1 of the channel. The upper margins 7 of legs 6, 6' are pressed or bent inwardly, or to the same sides of the legs as the legs 4, 4', and the free edges engage the sides along lines slightly spaced below the upper free edges of the latter for welding 7' along the line of engagement and between the upper edges of the margins 7 and free edges of sides 1. Likewise the margins 8 at the ends of legs 6, 6' and the corners of said legs at the adjacent ends of margins 7, 8 are turned inwardly the same as margins 7 and are welded to sides 1 in the same manner as described for margins 7, thus providing the steam chamber 3 between legs 4, 4' and bottom 2, and between sides 1 and legs 6, 6'. The angle strips providing legs 4, 4', 6, 6', when welded together at 5, thus constitute an outer channel in which the inner channel is carried.

In the following description, and in the claims, the term "inner channel" wherever used, refers to the channel formed by side walls 1, and bottom 2, and the term "outer channel" refers to the outer walls of the housing, as above described.

The tread plate illustrated in Figs. 2, 3, is made up of three longitudinally extending, parallel, separable sections, each being curved longitudinally on its bottom side to correspond to the longitudinal curve of bottom 2, for fitting thereagainst.

The central section 9 of the tread plate assembly is substantially flat while the two outermost sections 10 are curved in cross-section on their upwardly facing sides, when the plates are supported on bottom 2 to form upwardly curved continuations of the substantially flat upper surface of the central section. When these sections are assembled in the mold, they virtually form a single tread plate the upper surface of which, corresponds in contour transversely thereof, to the desired tread and shoulder shape of the tire casing. Preferably these sections are of aluminum, and the provision of the three pieces enables adjustment to various width tire treads, which is accomplished by substitution of sections 9 of different widths, as desired.

In some instances, a tread plate 11, as indicated in the left hand cavity in Fig. 5, which tread plate is merely a strip of sheet metal in which the longitudinally extending margins have been bent upwardly to divergently extending relation as indicated in Fig. 7, after which the outer sides of the upwardly bent margins as designated in dotted line at 11', are ground off to provide outer vertical surfaces resulting in tapered margins 12. This is a simple, cheap and new form of tread plate particularly suitable for smaller sized tires.

The side wall plates of my mold are best indicated in Figs. 3, 4 and are generally designated 13. There is a pair of these plates, each being adapted to substantially cover one of the inner sides of the inner channel of the form. Thus each of these plates is generally fan-shaped. In Fig. 4 the side therein illustrated is the side that is supported against one of the sides 1 of the inner channel. Each of these side wall plates is stamped from a single sheet of metal of rapid heat conductivity, such as aluminum. The longitudinal edges that extend longitudinally of the inner channel are preferably parallel and curved about substantially the same radius as the bottom 2. The longer or lower curved edge of each plate 13 terminates in a free edge, but the margin of each plate along its upper, or shorter edge, is bent over to form a flange 14, and from the juncture of such flange toward the free lower edge, each plate is curved as at 15, to conform to the outer contour of the bead portions of the tire 15 (indicated in dotted lines in Figs. 3, 5). This curvature preferably extends partially up the side walls of the tire so that a tire held between said side wall plates is supported in its proper shape by reason of the curvature of the plates 13.

From the point where said curvature 15 ends, the plates 13 extend substantially flat to the outer lower free edges thereof.

The margins 14 forming the flanges, as above described, are preferably formed at each of their ends, before bending, with ears or longitudinal projections 16, indicated in dotted line in Fig. 4. One of the longitudinal edges of each ear is curved to correspond to the curvature 15, while the opposite longitudinal edge is in straight extension of the free longitudinally extending edge of the flange 14. Thus when the flanges are formed, and ears 16 are bent over, the curved edges of the ears will follow the curved end edges of the curved portion 15, and the straight edges of the ears will be planar with the straight portion of the plate 13. The corresponding curved edges of plate 13 and ears 16 are then welded together and function as braces as well as closures at the ends of the plates 13, when the plates are fitted in the inner channel of the mold, and said ears also act to conduct heat to the side wall plates.

Relatively wide ribs 17 of aluminum corresponding generally in shape to the ears 16, may be welded to the plates 13 adjacent flanges 14, as indicated in Fig. 4, to reinforce the curved portions 15 of the plates as well as to function as heat transfer means for rapidly conducting heat from the sides 1 of the inner channel to the tire casing.

The plates 13 are positioned in the inner channel, with their lower margins opposite flanges 14 disposed between the lateral outer sides of the sections 10 of the tread plate, and the flat sides of the plates 13 extending away from said lower margins rest flat against the inner sides of the inner channel while the curved portions 15 adjacent flanges 14 extend inwardly toward each other across said inner channel. The ribs 17, and free edges of flange 4 and ears 16 rest against the inner sides of said inner channel. Practically all of the side plates over that area of the tire where the repair is effected is flat against the sides 1 of the inner channel.

Assuming the tire section is in the inner channel, as indicated in Fig. 3, and an air bag is in the casing, it will be seen that plates 13 may be elevated or lowered, to the correct height for conforming to the transverse contour of the outer side of the tire, at and adjacent the bead of the latter.

The bead plate 18, which extends longitudinally of the inner channel, is then fitted across the radially facing sides of the tire beads and over the flanges 14. This plate is about the width of the channel, and extends from end to end of the flanges 14, and so may be raised or lowered between sides 1, as desired. The bead plate 18 carries an adjusting screw 19, rotatably secured to said plate in a bearing 20 and threadedly extends upwardly through a threaded block 21 that supports a pair of parallel bars 22 at opposite sides thereof. Bars 22 extend transversely across the inner channel and the opposite ends of the bars extend past opposite sides of bolts 23 and between upper and lower adjusting nuts 24 on each of said bolts. The bolts may be welded to opposite outer sides of the inner channel, as indicated in Fig. 5, or they may be the ends of a stirrup bolt that extends below the inner channel as indicated on Fig. 2. Of course, in any case, suitable welding seals the openings in margins 7 through which the bolts pass upwardly to their positions between the opposite ends of the pair of bars. It is readily seen that by turning screw 19, which is provided with a square upper end, the bead plate may be raised or lowered according to which way it is turned when the nuts 24 are adjusted to lock the ends of bars 22 therebetween on each of the bolts 23. Also, upon removal of the uppermost of nuts 24, the tread plate may be readily removed from the mold and the tire is then free for removal, as are the side wall plates 13.

In the multiple cavity mold illustrated in Fig. 5, generally the same construction is followed as in Figs. 1 to 3. The outer channel has the legs 26, 26' thereof, that correspond in position to legs 4, 4' of Fig. 3, which are lengthened to enable reception of a pair or more of inner channels between the legs 6, 6'. These legs 26, 26' are welded together at 5, as already described for legs 6, 6'. Also, the inner channels are formed with flanges 27 on their adjacent sides 1", which flanges are welded together, and a central bolt 28 extends upwardly between the two channels and between bars 22', which latter bars correspond in function to bars 22 of Fig. 3, except that bars 22' extend across both of the inner channels. Screws 19 are secured to bead plates 18 that are respectively disposed in each inner channel, which screws threadedly pass through blocks 21' as in Fig. 3. Bolts 23' welded to the outermost sides of the inner channels extend between the ends of the pair of bars 22' and pairs of nuts 24' on bolts 23' and on bolt 28, function the same as nuts 24. Spacers 29 welded to the inner channels at their lower adjacent sides function, together with flanges 27, to secure the inner channels in spaced relation.

The bottoms 2' of the inner channels in Fig. 5, are not stamped from the same strip of metal as sides 1, 1', but are merely longitudinally curved strips that fit at their opposite longitudinally extending margins across the lower edges of separate side plates 1, 1' and welding, indicated at W between the free longitudinal edges of said bottom and the edges of sides 1, 1' secure the bottoms 2' to said sides 1, 1'. This form of construction is often preferable where large presses are not available for stamping the inner channel as one piece. Of course the lower margins of the sides 1, 1' may extend past the longitudinal edges of bottom 2' for welding below bottoms 2' rather than at the sides of the sides 1, 1', if desired.

Heretofore the methods employed for adjusting molds to various sized tires has necessitated the use of many relatively expensive accessories. With my invention, however, substantially all that is required are metal plates that are readily and quickly stamped out of a sheet of metal. The left hand inner channel illustrated in Fig. 5 is adjusted to receive a relatively small sized tire casing by the employment of as many flat, fan-shaped plates 30 as may be required at each lateral side 1 of the channel to reduce the width of the mold sufficiently to properly receive the tire when side wall plates 31, corresponding in structure to side wall plates 13 (but shaped for the smaller sized tire) are supported against the innermost of plates 31. Naturally the tread plate 11, already described, must be of the correct contour for the smaller tire casing. The right hand inner channel of Fig. 5 is adjusted for a larger sized tire casing, in which only one flat plate 31 is used between the side wall plates 13. By dropping out all of the flat plates 30, 31, and using the arrangement shown in Fig. 3, the inner channels of Fig. 5 may receive a still larger tire casing. In each instance the tread plate may be raised or lowered between the sides 1 of the inner channels. Of course the tread plate assembly of Fig. 3 or the tread plates of Fig. 5 may be substituted one for the other, as desired.

In the mold illustrated in Fig. 6 the inner channel is identical in structure with the inner channels illustrated in Fig. 5, having sides 1', a bottom 2'. Instead of the outer channel being in the form of angle strips welded together, I provide a pair of plates 33 spaced at opposite outer sides of the inner channel, which plates have inturned upper margins 7', and end margins 8', that are welded to the upper edges of sides 1 and to the end edges thereof, in the same manner as described for the molds of Figs. 3 and 5. These plates 33, however, extend directly downward with legs 34 at their ends, and a plate 35 below bottom 2' is welded at its edges to the inner sides of said plates 33 as at W' to form the bottom of the outer channel. The mold itself is therefore seen to form inner and outer channels with a steam chamber therebetween.

In all of the molds illustrated, air release means for releasing trapped air in the steam cavities is provided, as best indicated in Fig. 3, which air release means comprises relatively small pipes 37 secured by spot welds or otherwise to the sides of the inner channels within said steam cavity at the uppermost portion thereof. These pipes are open at their ends at 37' at the uppermost points in said steam chamber. At one of their corresponding ends, the pipes 37 extend downwardly to below bottoms 2 (or 2'), as at 37'' where they are connected by a cross pipe in which is a T fitting with the leg thereof extending through the bottom of the outer channel at one end thereof to a manual relief valve 38. This arrangement eliminates the necessity for four or more valves now required in single or multiple cavity molds, and the valve 38 is in a position where it is not likely to be struck and injured or broken off, as is common in conventional molds.

A thermometer 39 is secured to one side of the outer channel of each mold, and an automatic pressure relief valve 40 is also provided.

In instances where a steam boiler produces steam for the mold, a valved inlet 41 and valved steam outlet 42 is provided (Fig. 1) or the outlet may be closed and water injected to a level below bottoms 2 (or 2'), and thereafter gas burners 42, or any other source of heat, such as electricity, may be employed to convert the water into steam.

In the form of invention shown in Figs. 1, 2, 3 or 5, any suitable legs L (Fig. 1) may be attached to the mold or may detachably support the mold, if desired or the mold may be supported in a cabinet or other frame, at a suitable height, no specific claim to the form of such legs, cabinet or frame being made, such supporting means merely constituting a support for the mold.

The view shown in Fig. 4a is of a side wall plate that is particularly suited for bead repairs, where it is essential that heat be conducted to the head portions of the casing. This side wall plate itself is substantially the same as that shown in Fig. 4, but instead of the ribs 17 in the latter, I provide relatively thin sheet metal ribs 17' each provided with an ear 17'' along the outer longitudinal edge thereof. These ears extend toward each other and the space between the ribs is then filled with molten metal 50 of any suitable kind, such as lead, babbitt, aluminum, or an alloy. Or where it is desirable to extend the molten metal to the ends of the plate, the end members 16', which correspond to members 16 of Fig. 4, have ears 16'' that function the same as ears 17'', for retaining the molten metal 50, 51 in position. The outer side of the molten metal, after cooling, is surfaced to be flush with the flat portion of the plate extending away from the outer ends of the ribs or end members.

Having described my invention, I claim:

1. In a cavity vulcanizer for pneumatic tire casings; a mold comprising a channel having a flat bottom wall curved longitudinally of said channel, and flat, parallel opposed side walls extending upwardly from said bottom wall at substantially right angles thereto; a tread filler on said bottom wall formed with two opposite edge surfaces adjacent said side walls parallel with said side walls; a pair of opposed side plates within said channel with the sides thereof that are respectively adjacent said side walls being parallel with said side walls; the said side plates being slidable parallel to said side walls and the opposed surfaces of said side plates along their lower edges being in slidable engagement with said edge surfaces whereby said side plates may be moved to various positions toward and away from said bottom wall while maintaining slidable engagement with said side walls and said edge surfaces; the opposed surfaces of said side plates along their upper edges being of a contour conforming to the contour of the axially outwardly facing sides of the bead portion of a tire casing and the vertical width of said side plates being arranged and adapted to completely extend from the radially facing sides of such bead portion of a casing to be positioned in said channel between said side plates across the sides of such casing and a portion of the said edge surfaces of said tread filler.

2. In a cavity vulcanizer for pneumatic tire casings; a mold comprising a channel having a flat, horizontally disposed bottom wall curved longitudinally of said channel, and opposed side walls extending vertically upwardly from said bottom wall; the opposed surfaces of said side walls being flat for their entire vertical widths and parallel to each other and extending in planes at right angles to the plane of the flat upper surface of said bottom wall; vertically movable side plates respectively positioned adjacent the opposed surfaces of said side walls; a horizontally disposed top plate extending between said side walls and over the upper edges of said side plates and having a flat lower surface parallel with the upwardly facing surface of said bottom wall; means carried by said side walls supporting said top plate for movement of the latter toward and away from said upper edges of said side plates; a tread filler on said bottom wall engaging the lower portions of said side plates in slidable relationship with said side plates for permitting vertical movement of the side plates relative to each other and to said tread filler and side walls; and means on said side plates formed integrally therewith arranged and adapted to snugly engage the axially outwardly facing sides only of the bead portions and side walls of a section of a tire casing to be positioned within said channel when the side walls of such section and the tread portion thereof are respectively in engagement with the said plates and said tread filler.

3. A cavity vulcanizer comprising a pair of channels of sheet steel disposed one within the other and with their adjacent opposite sides, and the bottoms thereof, respectively, in spaced opposed relation providing the walls of a generally channel shaped steam chamber; supporting legs for said channels comprising extensions formed integrally with the side walls of the outer channel of said pair, the bottom wall of said last mentioned channel being welded along two opposite side edges thereof to said last mentioned side walls, and welded at the opposite end edges to the corresponding end edges of the bottom wall of the inner channel of said pair; the marginal portions of the side walls of the outer channel of said pair extending angularly inwardly toward each other along the end and upper edges of said latter channel and welded along said edges to the corresponding marginal portions of the side walls of the inner channel of said pair; a top plate in the open side of the inner channel of said pair extending longitudinally of said channel and movable toward and away from the bottom of said inner channel; means carried by the side walls of the inner channel of said pair supporting said top plate for said movement including a cross bar removably secured at its ends to the side walls of said inner channel and a vertical screw threadedly extending through said cross bar and swivelly secured at its lower end to said top plate.

4. In a construction as defined in claim 3, the side walls of the inner channel of said pair being flat and parallel with each other; tread plates removably supported on the bottom wall of said last mentioned channel having opposite outer edge surfaces adjacent said latter side walls parallel with each other and with the side walls of said latter channel; a pair of vertical side plates respectively positioned adjacent the opposite sides of the inner channel of said pair with the marginal portions along their lower edges telescopically slidable between said edge surfaces of said tread plates and said last mentioned side walls for vertical movement relative to said tread plates, said side plates being normally spaced along their lower edges from the bottom of said inner channel at various distances according to variations in the tires adapted to be positioned within said latter channel and between said side plates.

HAROLD L. BAKER.